United States Patent [19]
Howard, Jr. et al.

[11] Patent Number: 5,638,710
[45] Date of Patent: Jun. 17, 1997

[54] METHOD FOR SECURING A SPARE TIRE

[76] Inventors: Bobby L. Howard, Jr., 1919 W. 51st;
Bob L. Howard, 4118 S. 38th W. Ave.,
both of Tulsa, Okla. 74107

[21] Appl. No.: 463,195

[22] Filed: Jun. 5, 1995

Related U.S. Application Data

[63] Continuation of Ser. No. 267,874, Jun. 28, 1994, abandoned.

[51] Int. Cl.$^6$ ...................................................... E05B 65/12
[52] U.S. Cl. ........................ 70/259; 70/14; 224/42.23; 414/463
[58] Field of Search ........................ 70/14, 18, 19, 70/201–203, 209, 237, 238, 225, 226, 259, 260, 455; 224/42.06, 42.23–42.3, 42.41; 414/463

[56] References Cited

U.S. PATENT DOCUMENTS

| | | |
|---|---|---|
| 1,307,161 | 6/1919 | Stubblefield . |
| 3,245,239 | 4/1966 | Zaidener ................................ 70/202 |
| 3,884,057 | 5/1975 | Maurer .................................. 70/259 |
| 3,979,035 | 9/1976 | Huot ................................. 224/42.24 |
| 4,282,995 | 8/1981 | Austin ............................... 224/42.23 |
| 4,308,733 | 1/1982 | Tampa ................................... 70/259 |
| 4,526,021 | 7/1985 | Princell ................................. 70/183 |
| 4,594,866 | 6/1986 | Neyret .................................. 70/455 |
| 4,768,361 | 9/1988 | Derman ................................. 70/259 |
| 4,790,163 | 12/1988 | Appelbaum ............................. 70/455 |
| 4,794,771 | 1/1989 | Princell ................................. 70/259 |
| 4,819,461 | 4/1989 | Pearson .................................. 70/14 |
| 4,825,673 | 5/1989 | Drake .................................. 70/455 |
| 4,848,109 | 7/1989 | Henderson ............................... 70/14 |
| 4,858,454 | 8/1989 | McAnulty, III ........................ 70/455 |
| 4,873,851 | 10/1989 | Arnett .................................. 70/259 |
| 4,881,391 | 11/1989 | Vula et al. ............................ 70/455 |
| 5,199,287 | 4/1993 | McClary ................................ 70/259 |
| 5,475,995 | 12/1995 | Livingston ............................. 70/259 |

FOREIGN PATENT DOCUMENTS

| | | | |
|---|---|---|---|
| 968319 | 5/1975 | Canada .................................. 224/28 |
| 265943 | 9/1927 | United Kingdom . | |

*Primary Examiner*—Suzanne Dino
*Attorney, Agent, or Firm*—Head, Johnson & Kachigian

[57] ABSTRACT

A locking device for preventing the theft of spare tires mounted on a hoist mechanism underneath the rear of a pickup truck is provided. This device consists of a J-hook and lock. The J-hook is suspended from the hoist shaft with the long end projecting downward through a lug hole in the wheel. The long end of the J-hook has plurality of holes allowing for the adjustment to different thicknesses of tires and wheels. The lock has a tubular shaped body with a cross hole allowing it to slide up on to the long side of the J-hook where the push button mechanism can be engaged, locking it into the properly aligned hole in the J-hook.

5 Claims, 3 Drawing Sheets

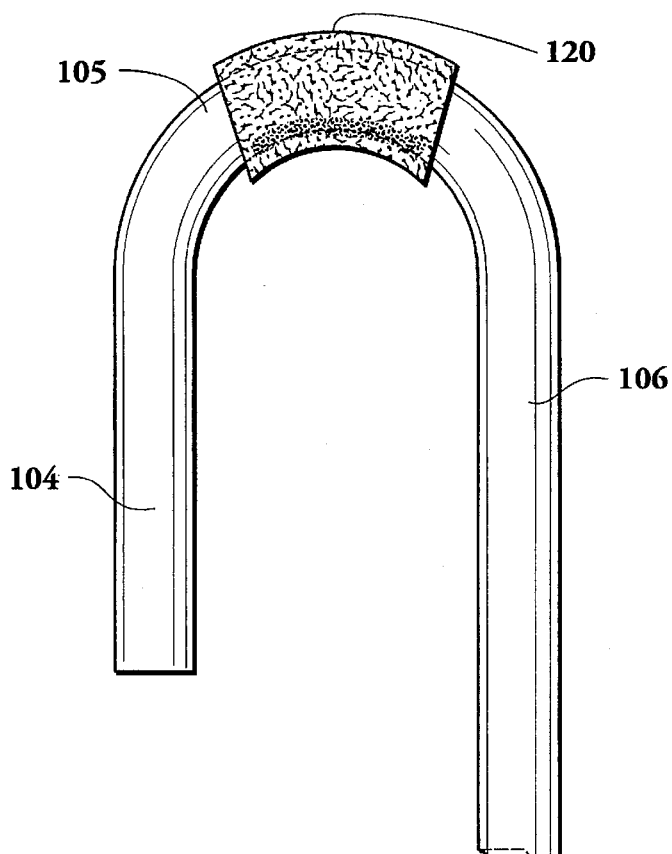
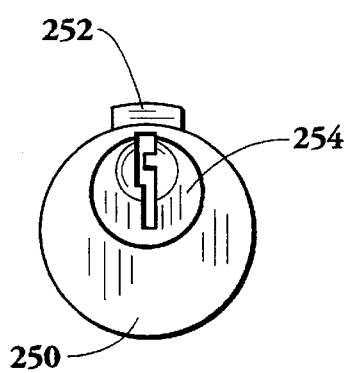
Fig. 2
Fig. 3

METHOD FOR SECURING A SPARE TIRE

CROSS-REFERENCE TO RELATED APPLICATION

This application is a continuation of U.S. patent application, Ser. No. 08/267,874, filed Jun. 28, 1994, and now abandoned.

BACKGROUND OF THE INVENTION

1. Field of the Invention

This invention relates generally to locks, and more specifically, to locks used to prevent theft of spare tires.

2. Prior Art

Spare tire theft continues to pose a problem to new pickup truck dealers. GM pickup trucks utilize a hoist mechanism to secure the spare tire underneath the rear of the pickup truck. The hoist has a shaft that rotates to raise and lower the spare tire. This convenience makes it easy for thieves to quickly lower and remove the spare tire from the truck while the truck is parked on the dealer lot. To prevent the theft of spare tires GM Truck dealers install spare tire locks on their pickup trucks. The largest dealers install hundreds of spare tire locks each year.

Because such a large number of locks are installed, it is desirable to have a lock that can be quickly installed and extremely difficult to defeat. Even a relatively low defeat rate can lead to substantial spare tire loss over time.

In the past, various devices have been proposed in an attempt to solve the problem of spare tire theft. One device is disclosed in U.S. Pat. No. 4,526,021 to Princell. The Princell device is installed on the end of the hoist shaft to prevent the spare tire from being lowered. This device has two brackets; one bracket fits inside the end of the hoist shaft, with the other bracket fitting over the hoist shaft and butting up against a stationary member. Each of the brackets has a flat portion with holes that align so that the shackle of a padlock can pass through the holes.

A second device is shown in U.S. Pat. No. 5,199,278 to McClary. It is also installed over the end of the hoist shaft to prevent lowering of the spare tire. This device has a cup that fits over the end of the hoist shaft with a locking shaft extending from the cup and through an opening in the bumper. A padlock is then placed through a hole in the locking shaft to prevent removal.

Each of these devices may be well suited for the particular application for which they were designed. However, their ability to be adapted to other applications is limited. The Princell device is well suited for use on pickup trucks having a stationary member for the bracket that fits over the hoist shaft to butt up against. However, this device is not effective on GM tracks because there is not a stationary member for the bracket to butt up against. The McClary device cannot be used on pickup trucks that do not have rear bumpers. Truck dealers often receive trucks with no rear bumper, so they would not be able to use the McClary device.

Another type of spare tire lock that is well suited for the hoist application is disclosed in U.S. Pat. No. 4,794,771 to Princell. This Princell device has a yoke that is saddled over the hoist haft after the spare tire has been lowered. Then, a shaft with a specially shaped tab at the end is placed through holes in the yoke and rotated downward. The shaft has a bend approximately forty-five degrees near the end with the tab allowing the shaft to hang vertically when rotated downward. Once the device is in final position and the spare tire has been raised the shaft protrudes through a lug hole. A lock is then slid up onto the shaft to prevent spare tire removal. However, this device has several drawbacks. The method necessary to install this device is cumbersome and time consuming. Installation of this device requires the spare tire to be lowered and then raised to install. Also, the use of the yoke and specially shaped tab portion at the end of the shaft makes assembly more difficult than is necessary.

In summary, the prior devices do not meet the needs of track dealers. The devices do not have the flexibility to fit all hoist applications and contain unnecessary components and steps to install.

It is therefore an object of the present invention to provide a spare tire lock with an improved design and method of installation. In addition the present invention provides a spare tire lock with the flexibility to fit all hoist applications.

SUMMARY OF THE INVENTION

The present invention provides a spare tire lock with a J-hook that is suspended from a shaft under the rear of the pickup truck. The J-hook hangs in the inverted position with the long side of the J-hook protruding through a lug hole in the wheel. The long side of the J-hook has a plurality of holes allowing for adjustment to different thicknesses of tires and wheels. The J-hook can be installed on the truck by placing the short side of the J-hook over the shaft and simultaneously placing the long side of the J-hook through a lug hole in the wheel. The present invention also has a tubular shaped lock with a cross hole which allows the lock to be slid up onto the portion of the J-hook which protrudes through the lug hole of the wheel. This lock has a push button mechanism with a locking bolt extending from the bottom of the push button that when it is engaged, it fits into the properly aligned hole it the J-hook, locking it in place and preventing the spare tire from being lowered. Further objects and advantages will become apparent from a consideration of the ensuing description and drawings.

BRIEF DESCRIPTION OF THE DRAWINGS

FIG. 2 shows a view of the spare tire lock with all parts labeled.

FIG. 3 shows a from view of the push lock.

Figure 1:
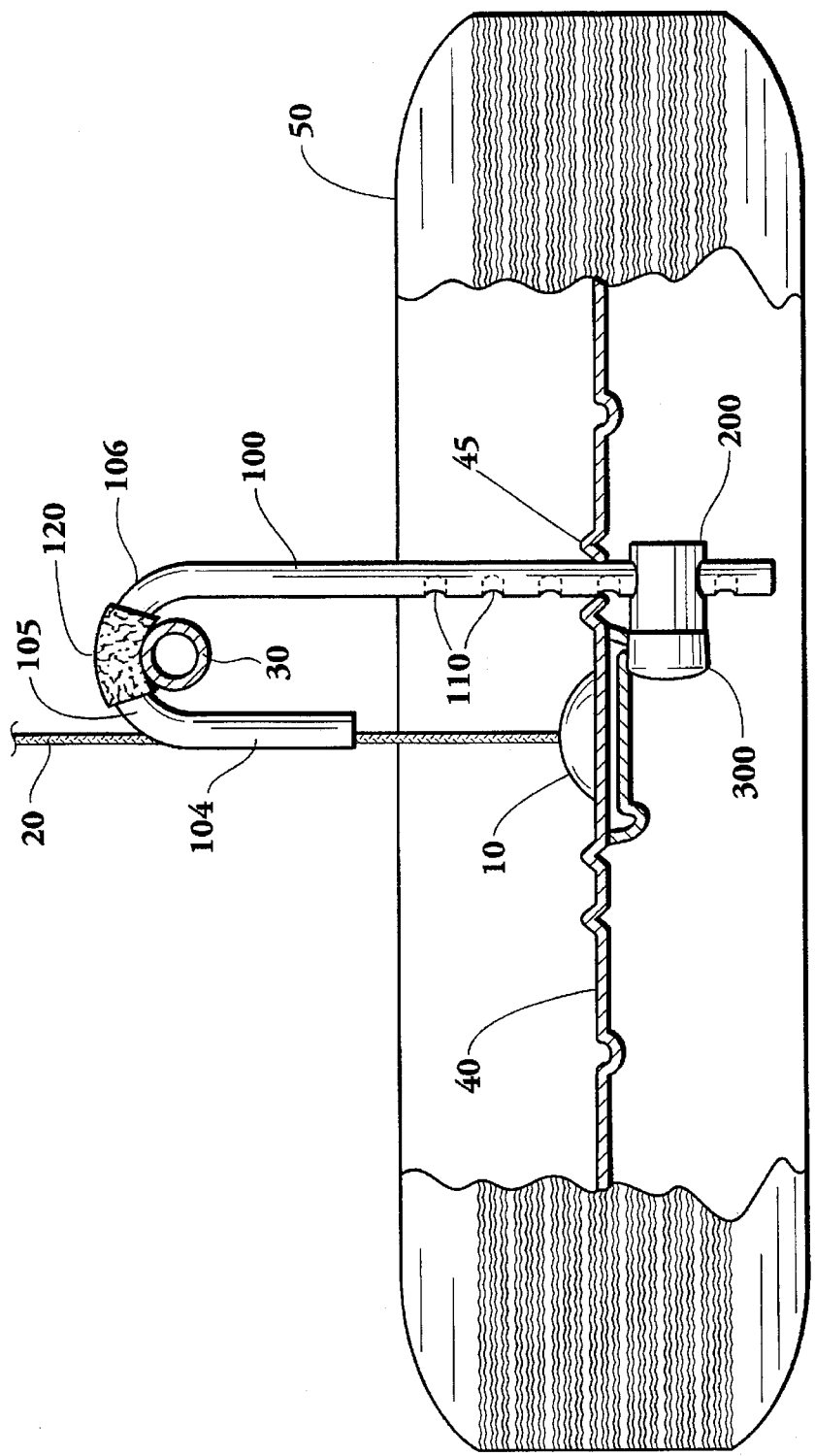
FIG. 1 shows spare tire lock in use.

| REFERENCE NUMERALS IN DRAWINGS | |
|---|---|
| 10 SUPPORT BRACKETT | 20 CABLE |
| 30 HOIST SHAFT | 40 WHEEL |
| 45 LUG HOLE | 50 TIRE |
| 100 J-HOOK | 104 SHORT SEGMENT |
| 105 CURVED SEGMENT | 106 LONG SEGMENT |
| 110 HOLES | 120 RESILIENT MEMBER |
| 200 LOCK HOUSING | 201 PUSH LOCK CHAMBER |
| 202 RETAINING PIN | 203 PUSH LOCK PIN RECEIVER |
| 204 CROSS HOLE | 205 LOCKING BOLT SUPPORT HOLE |
| 206 FLAT BOTTOM | 250 PUSH LOCK MECHANISM |
| 251 LOCKING BOLT | 252 PUSH LOCK BOLT |
| 253 MILLED SLOT | 254 TUMBLER |
| 255 SPRING ASSEMBLY | 256 SPRING HOLES |
| 257 SPRING | 258 SPRING PIN |
| 259 FLAT BOTTOM PUSH LOCK | 300 DUST COVER |

DETAILED DESCRIPTION OF THE PREFERRED EMBODIMENT

For the purposes of full disclosure the following description of the preferred embodiment of present invention is made. It will nevertheless be understood that no limitation upon the scope of the invention is thereby intended.

Referring to FIG. 1, the spare tire lock of the present invention has a J shaped hook 100, which is suspended form a hoist shaft 30. The J-hook 100 is made from a round rod with a bend of approximately 180 degrees forming a curve 105. The bend forming curve 105 creates two parallel sides; a short side 104 and a long side 106. The curve 105 has a resilient member 120 to prevent metal to metal contact between the hoist shaft 30 and the curve 105 of J-hook 100, thereby reducing rattles. The long side 106 of J-hook 100 protrudes through a lug hole 45 in the wheel 40. The long side 106 has a plurality of radially drilled holes 110. The holes 110 allow for adjustment to different thicknesses of wheels and tires. Each of the holes 110 are drilled to a depth approximately ½ the depth of the diameter of the rod.

Figure 4:
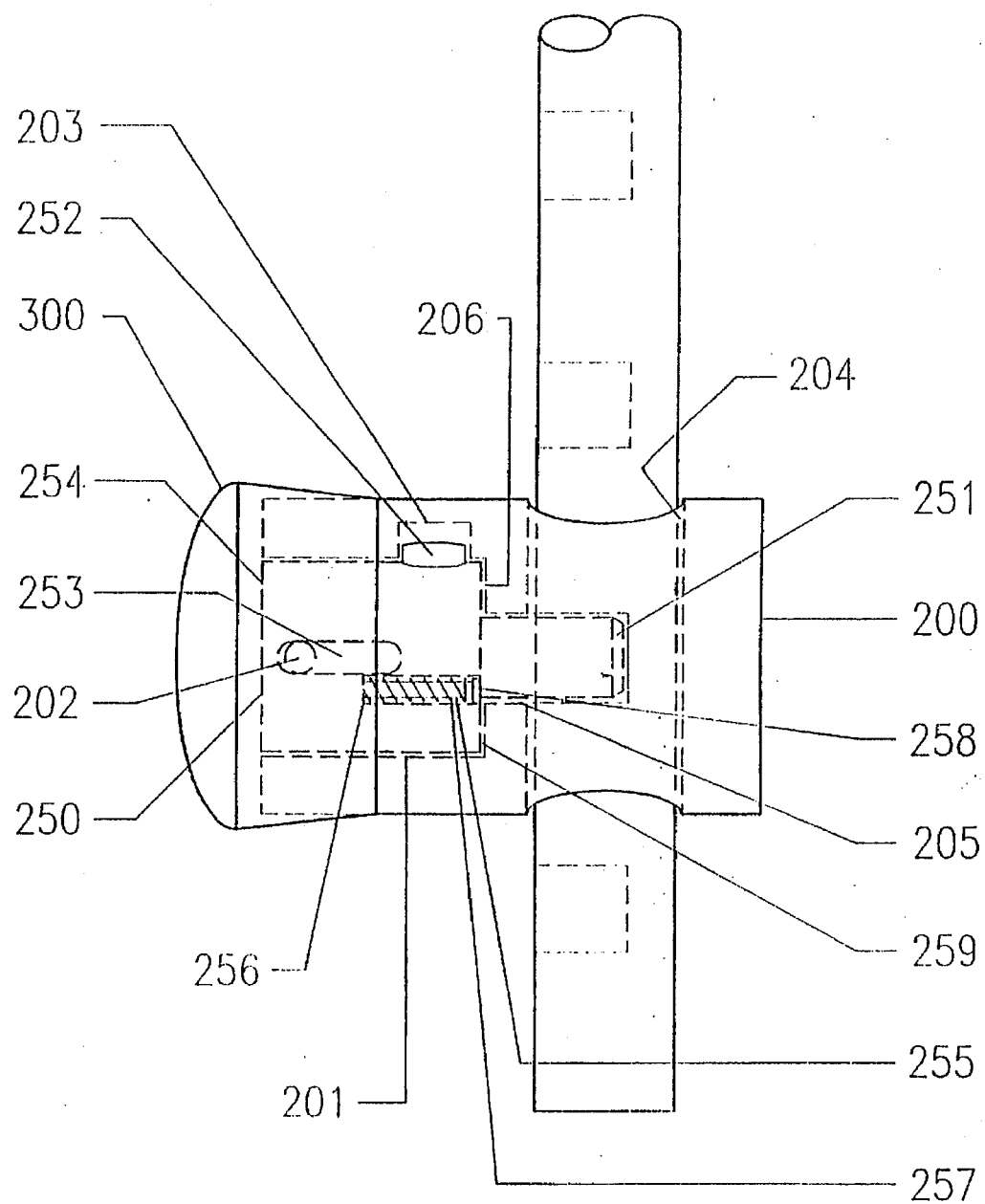
FIG. 4 shows an expanded view of the lock.

The spare tire lock of FIG. 2 and 4 includes a lock 200 that slides onto J-hook 100. The lock 200 has a tubular shaped body with a lock chamber 201 at one end to receive the push lock 250. The lock 200 also has a locking pin support hole 205 through which locking pin 251 passes when push lock 250 is in the locked position. The lock chamber 201 has a flat bottom 206 to provide a force bearing surface for a pair of spring assembles 255. The spring assemblies 255 force the push lock 250 out when unlocked. The spring assemblies 255 are comprised of a spring 257 and spring pin 258. Spring pin 258 is nested within spring 257. The spring assemblies are nested within spring holes 256 of the push lock 250. The lock chamber 201 also has a radially drilled hole that serves as a push lock pin receiver 203. The push lock pin 252 appears in FIG. 3. The engagement of the push lock pin 252 is shown in FIG. 4. The push lock 250 also has a milled slot 253. The retaining pin 202 is nested inside of milled slot 253. This serves as a method of retaining the push lock 250. The milled slot 253 and retaining pin 202 also guides and prevents rotation of the push lock 250. The lock 200 has a radially drilled cross hole 204 at the end opposite the lock chamber 201. This cross hole 204 is drilled large enough for the long side 106 of J-hook 100 to pass through. To prevent road dust from entering the lock a dust cover 300 is provided.

The method used to lock the spare tire is as follows: First, the J-hook 100 is hooked over hoist shaft 30 while simultaneously placing the long side of J-hook 100 through lug hole 45. Next the lock is slid up onto the long side 106 of J-hook 100. The lock should then be locked in the hole nearest the wheel 40 as seen in FIG. 1. This installation can be quickly accomplished without lowering the spare tire.

Whereas, the present invention has been described in relation to the drawings attached hereto, it should be understood that other and further modifications, apart from those shown or suggested herein, may be made within the spirit and scope of this invention.

What is claimed is:

1. A method of securing a spare tire to a vehicle, said spare tire having a wheel and said vehicle possessing a spare tire winch assembly having a hoist shaft disposed above said spare tire, said method comprising the steps of:
   (a) accessing an area above said spare tire in order to position a solid, one-piece J-shaped rod member having a short segment, a curved segment, and a long segment;
   (b) hooking said curved segment of said rod member around said hoist shaft without lowering said spare tire;
   (c) simultaneously extending said long segment through a lug hole in said wheel; and
   (d) fastening a lock to a portion of said long segment extending through said lug hole.

2. The method according to claim 1, wherein said long segment is provided with a plurality of locking holes drilled to a depth of about one-half the diameter of said long segment to facilitate fastening to said lock.

3. The method according to claim 2, wherein said lock comprises a push lock having a cross hole to slidably engage said long segment and a locking bolt for mating with said locking holes.

4. The method according to claim 1, wherein said curved segment is provided with a resilient sleeve.

5. The method according to claim 1, further comprising positioning a dust cover about a portion of said lock for preventing contaminants from entering said lock.

* * * * *